United States Patent
Berglund et al.

(10) Patent No.: US 6,681,574 B2
(45) Date of Patent: Jan. 27, 2004

(54) METHOD FOR CONTROLLING AIR FLOW TO AN ENGINE

(75) Inventors: Sixten Berglund, Torslanda (SE); Mats Andersson, Västra Frölunda (SE)

(73) Assignee: Volvo Lastvagnar AB, Göteborg (SE)

(*) Notice: Subject to any disclaimer, the term of this patent is extended or adjusted under 35 U.S.C. 154(b) by 0 days.

(21) Appl. No.: 10/065,928

(22) Filed: Dec. 2, 2002

(65) Prior Publication Data

US 2003/0110772 A1 Jun. 19, 2003

Related U.S. Application Data

(63) Continuation of application No. PCT/SE01/01153, filed on May 23, 2001.

(30) Foreign Application Priority Data

May 31, 2000 (SE) .............................. 0002044

(51) Int. Cl.[7] .............................. F02B 33/44
(52) U.S. Cl. .............................. 60/614; 60/624; 60/609; 477/32
(58) Field of Search .............................. 60/614, 624, 609, 60/607; 123/561; 477/32, 33, 31

(56) References Cited

U.S. PATENT DOCUMENTS

| | | | | |
|---|---|---|---|---|
| 4,748,812 A | * | 6/1988 | Okada et al. ................. | 60/614 |
| 5,133,188 A | * | 7/1992 | Okada ........................ | 60/609 |
| 5,713,204 A | * | 2/1998 | Kadlicko .................... | 60/608 |
| 5,729,978 A | | 3/1998 | Hiereth et al. ............... | 601/624 |
| 6,050,094 A | * | 4/2000 | Udd et al. ................... | 60/624 |
| 2002/0006848 A1 | * | 1/2002 | Tabata ....................... | 477/32 |

FOREIGN PATENT DOCUMENTS

| | | | | |
|---|---|---|---|---|
| DE | 4128642 A1 | 3/1993 | | |
| EP | 0417732 A2 | 3/1991 | | |
| EP | 1255031 A2 | * 11/2002 | | F02B/67/00 |
| JP | 9137732 A | 5/1997 | | |
| JP | 11200870 A | * 7/1999 | | F02B/37/00 |
| JP | 11294175 A | * 10/1999 | | F02B/37/04 |
| SU | 1686202 A | 10/1991 | | |

\* cited by examiner

*Primary Examiner*—Thomas Denion
*Assistant Examiner*—Thai-Ba Trieu
(74) *Attorney, Agent, or Firm*—Howrey Simon Arnold & White LLP

(57) ABSTRACT

Methods for controlling intake air flow to an internal combustion engine having an output shaft driven by the internal combustion engine, an intake air pipe, an exhaust gas pipe, a compressor located in the intake air pipe, a turbine located in the exhaust gas pipe, a transmission system connecting turbine, compressor, and output shaft for energy transfer between the turbine and compressor, between the turbine and output shaft, and between the output shaft and compressor. The transmission system includes a variable transmission between the output shaft and compressor and a control means for controlling the gear ratio in the variable transmission.

8 Claims, 4 Drawing Sheets

METHOD FOR CONTROLLING AIR FLOW TO AN ENGINE

CROSS REFERENCE TO RELATED APPLICATIONS

This application is a continuation patent application of International Application No. PCT/SE01/01153 filed May 23, 2001 which was published in English pursuant to Article 21(2) of the Patent Cooperation Treaty, and which claims priority to Swedish Application No. 0002044-6 filed May 31, 2000. Both applications are expressly incorporated herein by reference in their entireties.

BACKGROUND OF INVENTION

Technical Field

The present invention relates to a method for controlling the intake airflow to an internal combustion engine and to a control circuit for implementing control methods therefore. More particularly, the invention relates to method(s) for controlling the intake air flow to an internal combustion engine of a supercompound-type. This type of engine has a driven output shaft, an intake air pipe, an exhaust gas pipe, a compressor located in the intake air pipe, and a turbine located in the exhaust gas pipe. There is a transmission system that connects the turbine, compressor and output shaft for energy transfer between the turbine and compressor, between the turbine and output shaft, and between the output shaft and compressor. The transmission system includes a variable transmission between at least two of the components including the compressor, turbine and output shaft, and a control mechanism or means for controlling the gear ratio in the variable transmission.

Background of the Invention

When using internal combustion engines, it is of interest to ensure that as much as possible of the energy produced by combustion can be utilized for the intended purpose. This has resulted in the manufacture of turbocharged engines in which energy from the exhaust gases is utilized for compressing the air on the inlet side of the engine, whereby the energy conversion by the engine can be increased. Turbocompound-engines are a further development in which the exhaust gas energy can be returned to the output shaft of the engine, whereby energy can be recovered from the exhaust gases. A further development of these two above-mentioned concepts is called a supercompound-engine in which energy from the exhaust gases can be returned to the output shaft, and can be utilized for operating a compressor located on the inlet side of the engine. By means of the connection between shaft, compressor and turbine, energy also can be transferred from the output shaft to the compressor in order to obtain a faster response of the turbocharging pressure increase on the inlet side of the engine than when only a turbocharger is utilized.

Supercompound-type internal combustion engines include an output shaft driven by the internal combustion engine, an intake air pipe, an exhaust gas pipe, a compressor located in the intake air pipe, and a turbine located in the exhaust gas pipe. A transmission system is connects the turbine, compressor, and output shaft for energy transfer between turbine and compressor, between the turbine and output shaft, and between the output shaft and compressor. The transmission system includes a variable transmission between the output shaft and compressor, and a control means for controlling the gear ratio in the variable transmission.

Furthermore, in connection with compressor-charged engines, the charging pressure is regulated by means of comparing measured pressure on the inlet side of the internal combustion engine with desired charging pressure calculated from given vehicle data, such as, and for example, desired acceleration, engine speed, and other types of engine and performance characteristics. In these cases, the control algorithms include such concepts as P (proportional), PI (proportional and integrating), PID (proportional, integrating and derivative), and LQ (Linear Quadratic).

It has been found that the control algorithms that are utilized in supercharged systems are unreliable when they are utilized for controlling the flow of inlet air to internal combustion engines of the supercompound-type. This results in the control system becoming slow and unstable, causing undesired pressure fluctuations to occur on the inlet side of the internal combustion engine. As a result of these undesired pressure fluctuations, problems with controlling the air/fuel-mixture to achieve the correct proportions will also arise, something that is of importance, for amongst other reasons, to reduce nitrogen oxide emissions from internal combustion engines of the diesel-type.

SUMMARY OF INVENTION

A first object of the present invention is to provide a method for controlling the flow of intake air to an internal combustion engine of the supercompound-type that enables a fast and stable control process in which the occurrence of undesired pressure fluctuations is reduced.

This object can be exemplarily achieved by means of creating a control signal for controlling a variable transmission between at least two of the components including the output shaft, turbine, and compressor at least partly from a signal based on the difference between a desired and an actual value of a condition variable in the intake air pipe, and partly from a signal based on the rotational speed of the compressor and/or turbine. In this way, a control system is obtained where changes in the considerable rotational energy stored in the turbine and/or compressor is taken into consideration, which implies that the control method reduces the risk that undesired fluctuations of the intake air flow are generated.

Another object of the invention is to provide a control circuit for implementing the described control method or strategy.

BRIEF DESCRIPTION OF DRAWINGS

In the following, the invention will be described in greater detail with reference to attached drawings, in which.

DETAILED DESCRIPTION

Figure 1:
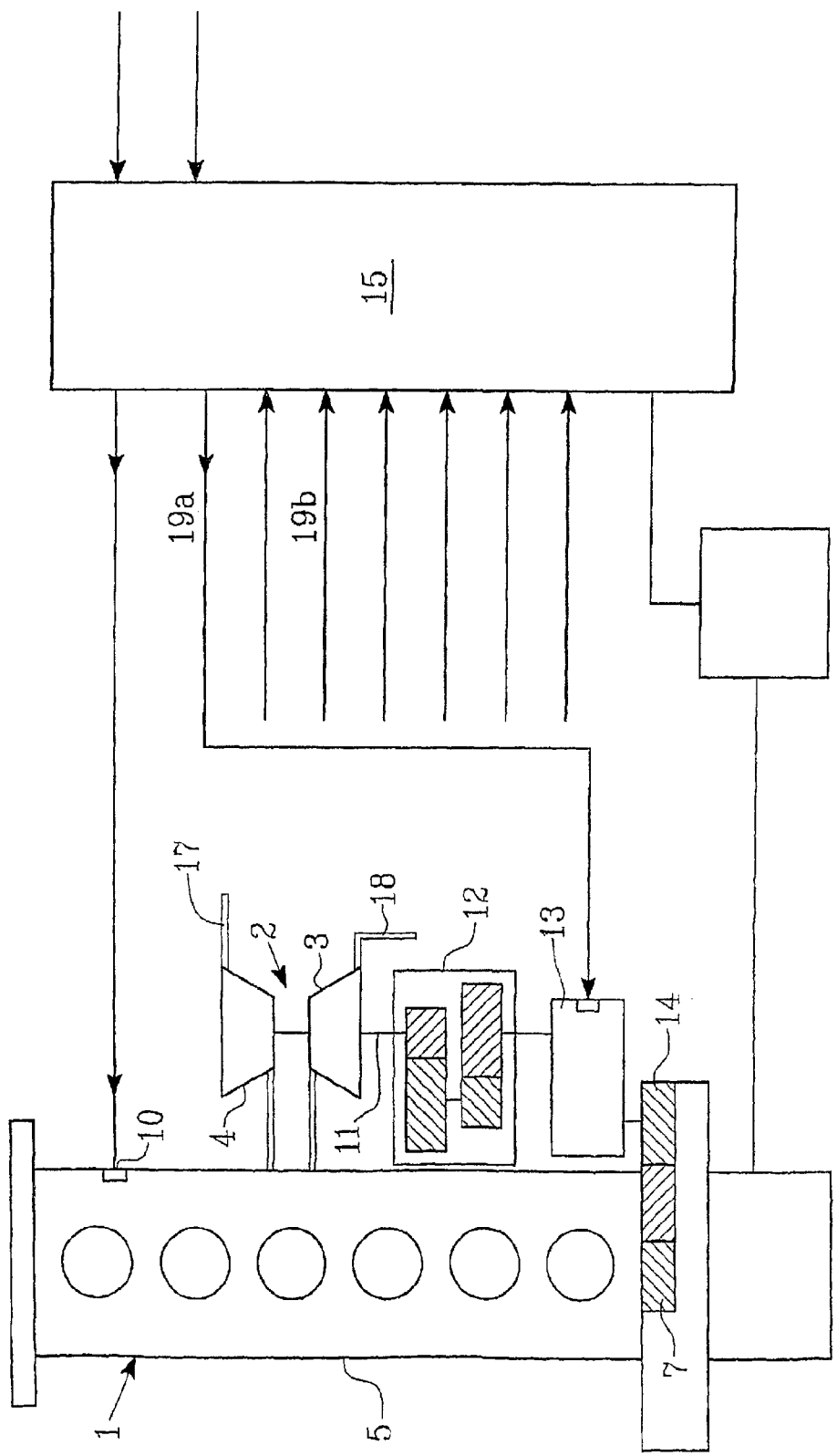
FIG. 1 shows a schematic representation of an internal combustion engine of supercompound type.

FIG. 1 shows a six-cylinder diesel engine 1 having a turbocompressor 2 having a turbine element 3 and a compressor element 4. The turbocompressor 2 is typically rigidly supported by a bracket secured by screws to the engine block and has an exhaust gas inlet in the turbine element 3 connected to an exhaust manifold included in the exhaust gas pipe 18 via a flexible connection such as a bellows system. This allows a certain amount of displacement of the outlet of the exhaust manifold in relation to the inlet of the turbine element caused by thermal expansion. The compressor element 4 is connected to the inlet air pipe 17 of the engine in a conventional way, and is therefore not illustrated in great detail; as an example, it may be connected via an intermediate induction air cooler.

The engine 1 can be equipped with a compression braking device 10, schematically indicated, which can be of the type disclosed and described in SE 466 320, and by means of which the cylinders of the engine can be connected to the exhaust gas manifold of the engine in the later portion of the compression stroke in order to increase the motor-brake power. Accordingly, for a closer description of the design and function, reference is made to SE 466 320 and the corresponding U.S. Pat. No. 5,146,890, which is expressly incorporated herein by reference.

In one embodiment of the invention, a transmission system connecting the turbine, compressor, and output shaft 7 is provided for energy transfer between the turbine and compressor, between the turbine and output shaft, and between the output shaft and compressor. The transmission system includes a variable transmission between at least two of the components including the output shaft, turbine, and compressor. A control mechanism or means for controlling the variable transmission is designed as further described hereinbelow.

The rotor shaft 11 of the turbocompressor 2 is connected to the output or output shaft 7 of the engine via a high-speed driving gear 12, a transmission 13, preferably with an infinitely variable speed or ratio (which may take the form of a so-called Continuously Variable Transmission—CVT), and a low-speed driving gear 14. A freewheel mechanism by means of which the driving connection between the rotor shaft 11 and the output shaft 7 can be disconnected, can be included in the chain of components from the rotor shaft 11 to the output shaft 7. In the high-speed driving gear 12, a first reduction of rotational speed is obtained from the working rotational speed of the turbocharger, about 100,000 rpm, down to the working rotational speed of the continuously variable transmission 13, at about 10,000 rpm. In the low-speed driving gear 14, the rotational speed is further reduced down to the working rotational speed of the output shaft 7 that is about 2000 rpm.

In an alternative embodiment, a variable transmission can be connected between the compressor and turbine, wherein the output shaft can be connected to the compressor or turbine either via a variable transmission or a fixed transmission.

In a preferred embodiment, a variable transmission is utilized that has an infinitely variable mechanical transmission. However, it is also conceivable that the transmission may be a power transmission controlled via an electric motor or hydrodynamic coupling(s).

By fixing the turbocharger 2 to the engine block in the above-described way, the risk of a change in the alignment between the shafts of the turbocharger and the driving gear 12 is eliminated, something which otherwise could become the consequence of differences in the thermal expansion between the exhaust manifold and the engine block in case the turbocharger would be rigidly suspended from the exhaust manifold in a conventional way.

A control unit 15, which preferably takes the form of a microprocessor, provides output signals for engagement and/or disengagement of the coupling that engages the drive of the turbocharger or compressor 2 with the engine crankshaft, and which can be incorporated in the continuously variable type transmission 13. Furthermore, the control unit 15 provides a signal 19a for setting the gear ratio of the transmission 13, depending on a number of engine and vehicle data, received via input channels 19b from a number of conventional type gauges.

Figure 2:
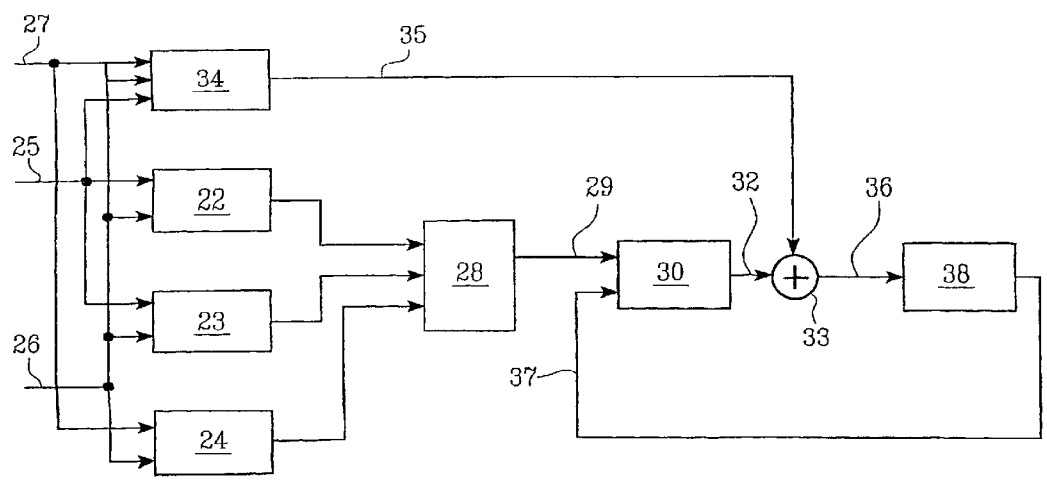
FIG. 2 is a schematic representation of a control system configured according to the invention.

FIG. 2 shows a diagram for a control system that is intended to generate desired charging pressure to the inlet side of the internal combustion engine 1. The desired charging pressure is determined from given engine data.

In the present embodiment, the desired charging pressure is generated as follows. Three functional blocks are arranged in the control computer 15 of the engine: a first functional block 22 for controlling air and fuel-mixture; a second functional block 23 for controlling motor-brake function; and a third functional block 24 for limiting the rotational speed of the compressor. Input data to the first functional block 22 for controlling air and fuel-mixture includes a first signal 25 representing requested fuel quantity and a second signal 26 representing measured or calculated engine speed. The first signal 25 representing requested fuel quantity is created in a known way from, amongst other things, input data from a driver operated foot throttle. The second signal 26 representing measured or calculated engine speed is also created in a known way, for example by means of a transmitter which emits a signal from a tooth wheel mounted in connection with the crankshaft or camshaft, wherein a pulsed signal having a frequency which constitutes a measure of the rotational speed of the engine is created. Input data to the second functional block 23 for controlling the engine-brake function includes the first signal 25 representing requested fuel quantity and the second signal 26 representing measured or calculated engine speed, but also considers input data from an engine-brake actuator by means of which the requested engine-brake effect is controlled. Input data to the third functional block 24 for limiting the rotational speed of the compressor is constituted by the second signal 26 representing the engine speed and a third signal 27 representing the rotational speed of the turbine located in the exhaust gas pipe of the internal combustion engine. The third signal is created by means of measuring a reduced rotational speed of a shaft connected to the turbine shaft by means of a variable transmission or, alternatively, by means of estimating the rotational speed from given or calculated data relating to pressure conditions upstream and downstream of the turbine.

Thereafter, the output signals from the above-mentioned functional blocks are filtered in a filter where the output signal from the first functional block 22 for controlling air and fuel mixture is restricted by the output signals from the second functional block 23 for controlling engine-brake function, and the third functional block 24 for limiting the rotational speed of the compressor. The reason for this is that the desired torque is restricted, taking over-speeding of the compressor into consideration and in case an input signal indicating presence of engine-braking has been emitted. When this first filtration has taken place, the signal is transformed via a map-based filter 28 into a fourth signal for setting the desired charging pressure. The fourth signal relating to the desired charging pressure is fed into a PI-regulator 30 (proportional integral based regulator) together with a signal 37 representing measured charging pressure of the controlled system 38 for controlling the gear ratio between the output shaft and compressor. From this, the compressor achieves the intended or required rotational speed for generating a desired inlet airflow as a function of the first control signal 32 and the second control signal 36. The charging pressure is exemplarily measured using a probe mounted downstream of the compressor and located in the inlet of the internal combustion engine.

Thereafter, the PI-regulator generates a first control signal 32 calculated from the difference between desired and actual charging pressure.

This signal is compensated in a compensating circuit 33 which receives an output signal from a fourth functional block 34 for calculating torque compensation of the turbine and compressor system. The task of this functional block is to calculate or estimate the influence on the flow in the exhaust gas pipe and inlet pipe of the internal combustion engine which is created by the rotational energy and demands for torque supplied to the turbine and compressor system for changing the rotational energy. This means that the fourth functional block estimates the response required in order to achieve a requested change of rotational speed of the compressor and turbine system. Input data to the fourth functional block 34 for calculating torque compensation of the turbine and compressor system includes the first signal 25 representing requested fuel quantity, the second signal 26 representing the engine speed, and a third signal 27 representing the rotational speed of the turbine located in the exhaust gas pipe of the internal combustion engine. From the fourth functional block, a second control signal is emitted which, accordingly, is based on actual rotational speed of the turbine and/or compressor.

In one embodiment of the invention, the first control signal corresponds to the torque that is to be applied onto the compressor starting from a feedback signal based on a condition variable in the intake air pipe. This condition variable is preferably constituted by the pressure. In this embodiment, the second control signal corresponds to the disturbing torque which is caused by the compressor, turbine, and variable transmission.

In this case, these two signals are added in order to create a third control signal corresponding to torque applied onto the compressor.

In a more advanced embodiment of the invention, the function, when creating the third control signal, further includes a parameter selected from between charging pressure, energy recovery from exhaust gas flow, and emission values, and wherein different priorities between these parameters can be accomplished in different operation conditions. This means that the engine can be controlled towards more optimal values for torque generation, energy recovery, and/or emission values depending on the requirements of a specific operation condition.

In the compensating circuit 33, a second control signal 36 for controlling the gear ratio between the output shaft and compressor is created, wherein the compressor achieves the intended rotational speed for generating a desired intake air flow as a function of the first control signal 32 and the second control signal 36.

Figure 3:
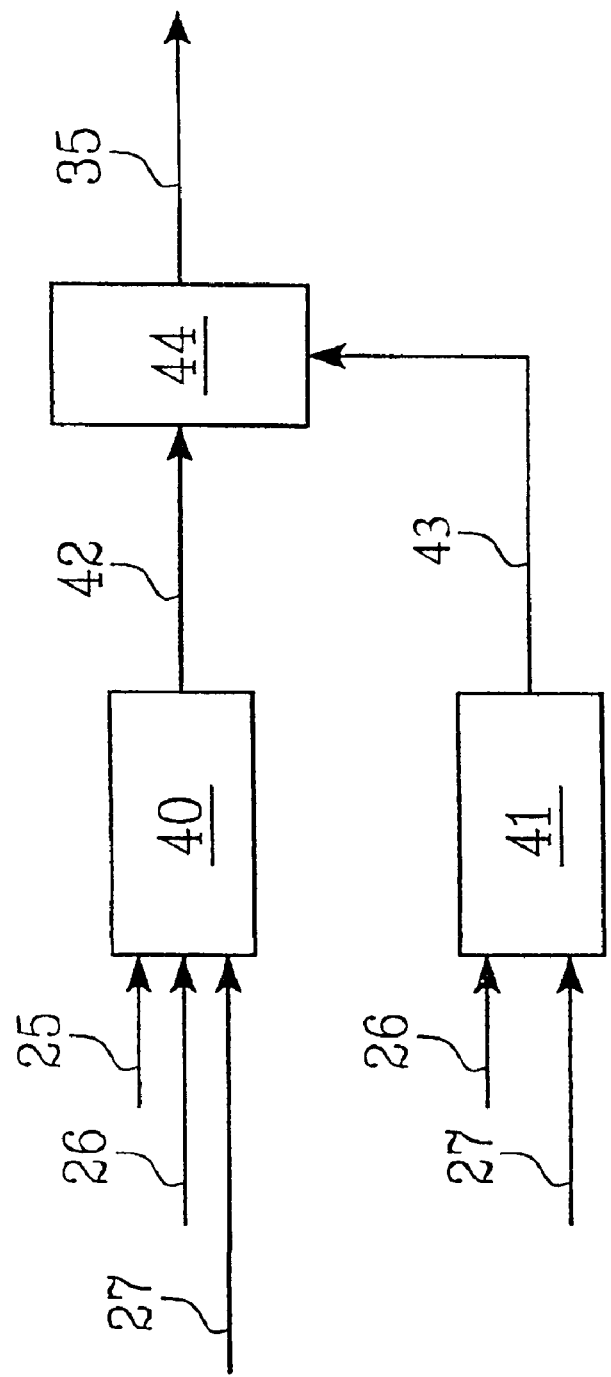
FIG. 3 schematically illustrates an embodiment of torque compensation in accordance with the control system depicted in FIG. 2.

FIG. 3 shows a control system for feed forward control of a third control signal 35. The third control signal 35 is based on actual rotational speed of the turbine and/or compressor. This control system corresponds to the fourth functional block 34 in FIG. 2. Input data to this control system includes the first signal 25 representing requested fuel quantity, the second signal 26 representing the engine speed, and the third signal 27 representing the rotational speed of the turbine located in the exhaust gas pipe of the internal combustion engine. The fourth functional block 34 comprises two, preferably map-based, control circuits. A map-based control circuit is constituted by a control circuit that is known and in which output data is created from a parameter volume of input data by means of a function defined by mappings between input and output data, preferably based on experience. The two map-based control circuits are constituted by a first control circuit 40 for calculating driving torque of the turbine and compressor system, and a second control circuit 41 for calculating how a variable transmission included in the turbine and compressor system influences the driving torque of turbine and compressor system. The control signal 35 calculated by the control circuit 34 compensates for the static torque on the turbine and compressor system which arises in a given operation point when engine speed, turbine speed, compressor speed, charging pressure, and fuel flow are concerned, in case the turbine torque does not correspond exactly to the compressor torque. By means of compensating for this lack of match between the turbine and compressor, in an ideal condition, it is achieved that the control signal 32 only has to supply the torque required in order to change the actual rotational condition to the desired one.

Input data to the first control circuit 40 includes the first signal 25 representing requested fuel quantity, the second signal 26 representing the engine speed, and the third signal 27 representing the rotational speed of the turbine located in the exhaust gas pipe of the internal combustion engine. Input data to the second control circuit 41 includes the second signal 26 representing the engine speed, and the third signal 27 representing the rotational speed of the turbine located in the exhaust gas pipe of the internal combustion engine. From this input data, the condition of the variable transmission included in the turbine and compressor system is determined. Thereafter, a first output signal 42, representing the influence of the turbine and the compressor on torque transferred via the variable transmission, is created via the first map-based control circuit 40. In the second map-based control circuit 41, a second output signal 43 representing the influence of the variable transmission on torque transferred therethrough is created. From these two output signals, the above-mentioned second control signal 35 is created in a third control circuit 44.

Figure 4:
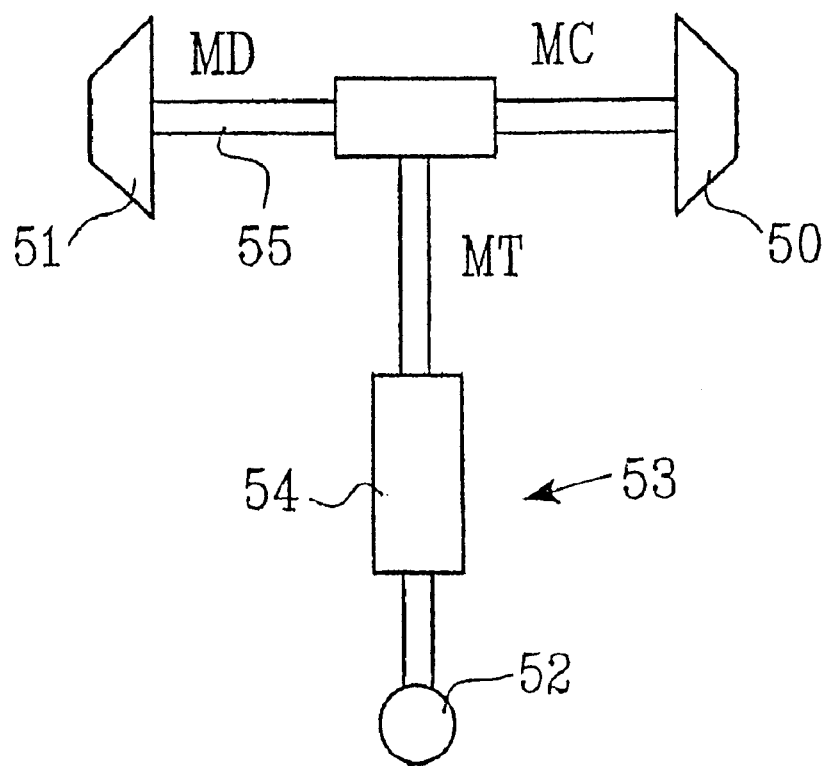
FIG. 4 is a schematic representation of the energy transfer in a supercompound engine system.

FIG. 4 is a schematic representation of an energy transfer system in a supercompound engine. The system includes a turbine 50, a compressor 51, and an output shaft 52 from the engine. These components are connected via a transmission 53 that comprises a controlled variable unit 54. In this case, the variable transmission is arranged between output shaft 52 and the turbine and compressor that are located on a common shaft 55. In order to maintain torque, it is required that $M_T+M_L+M_D=0$, where $M_T$ constitutes torque transferred from the output shaft of the engine, $M_L$ constitutes torque delivered from the turbine, and $M_D$ constitutes driving torque on the compressor. $M_L$ and $M_D$ are determined from input data relating to rotational speed of turbine and compressor, fuel supply, and engine speed. This is done in a way which is well known to the skilled person, for example by means of mapping speed to torque, wherein the mapping function has been obtained by means of calculations and testing in a known way.

The invention is not limited to the above-described embodiments, but can be varied within the scope of the following claims.

What is claimed is:

1. A method for controlling intake airflow to an internal combustion engine, said method comprising:

providing an engine having an output shaft driven thereby, an intake air pipe, an exhaust gas pipe, a compressor located in the intake air pipe, a turbine located in the exhaust gas pipe, a transmission system connecting the turbine, the compressor, and the output shaft for energy transfer between the turbine and the compressor, between the turbine and the output shaft, and between the output shaft and the compressor, the transmission system comprising a variable transmission between at least two of the output shaft, the turbine and the compressor, and a control means for controlling the variable transmission;

creating a first control signal as a function of the difference between an actual value and a desired value of a condition variable in the intake air pipe;

creating a second control signal from an actual rotational speed of one of the compressor and the turbine; and creating a third control signal for controlling the variable transmission as a function of the first and the second control signals.

2. The control method as recited in claim 1, wherein the transmission system further comprises a mechanical gearbox having a variable gear ratio.

3. The control method as recited in claim 2, wherein the transmission system further comprises a mechanical gearbox having an infinitely variable gear ratio.

4. The control method as recited in claim 1, wherein the transmission system further comprises a variable transmission disposed between the output shaft and the turbine.

5. The control method as recited in claim 1, wherein the first control signal corresponds to the torque requested to be applied on the variable transmission, determined from the difference between actual and desired value of the pressure condition in the intake air pipe, and the second control signal corresponds to the disturbing torque from one of the compressor and the turbine determined from an actual rotational speed of one of the compressor and the turbine.

6. The control method as recited in claim 1, wherein the function when creating the third control signal further comprises at least one of the parameters being selected from a charging pressure value, an energy recovery value from exhaust gas flow, and an emission value, and wherein different priorities between the parameters are achieved in different operation conditions.

7. A method for controlling intake airflow to an internal combustion engine, said method comprising:

providing an engine having an output shaft driven thereby, an intake air pipe, an exhaust gas pipe, a compressor located in the intake air pipe, a turbine located in the exhaust gas pipe, a transmission system connecting the turbine, the compressor, and the output shaft for energy transfer between the turbine and the compressor, between the turbine and the output shaft, and between the output shaft and the compressor, the transmission system comprising a variable transmission between the output shaft and the compressor, and a control means for controlling the gear ratio in the variable transmission;

determining a desired charging pressure from given vehicle data;

measuring an actual charging pressure; and calculating a first control signal from the difference between the actual and the desired charging pressure, calculating a second control signal based on an actual rotational speed of one of the compressor and the turbine, and calculating a third control signal for controlling the gear ratio between the output shaft and the compressor whereby the compressor achieves an intended rotational speed for generating a desired intake air flow as a function of the first control signal and the second control signal.

8. A control method for a supercompound-engine, said method comprising:

generating a control signal to a variable transmission included in a supercompound-engine, wherein the control signal constitutes a function of a first control signal generated by means of a feed-back coupling of a condition variable in an intake air pipe arranged at the supercompound-engine, and a second control signal generated by means of a feed forward coupling of actual rotational speed of one of a turbine and a compressor arranged at the supercompound-engine.

* * * * *